April 15, 1952     P. DANDURAND     2,593,274
HUBCAP
Filed March 20, 1948
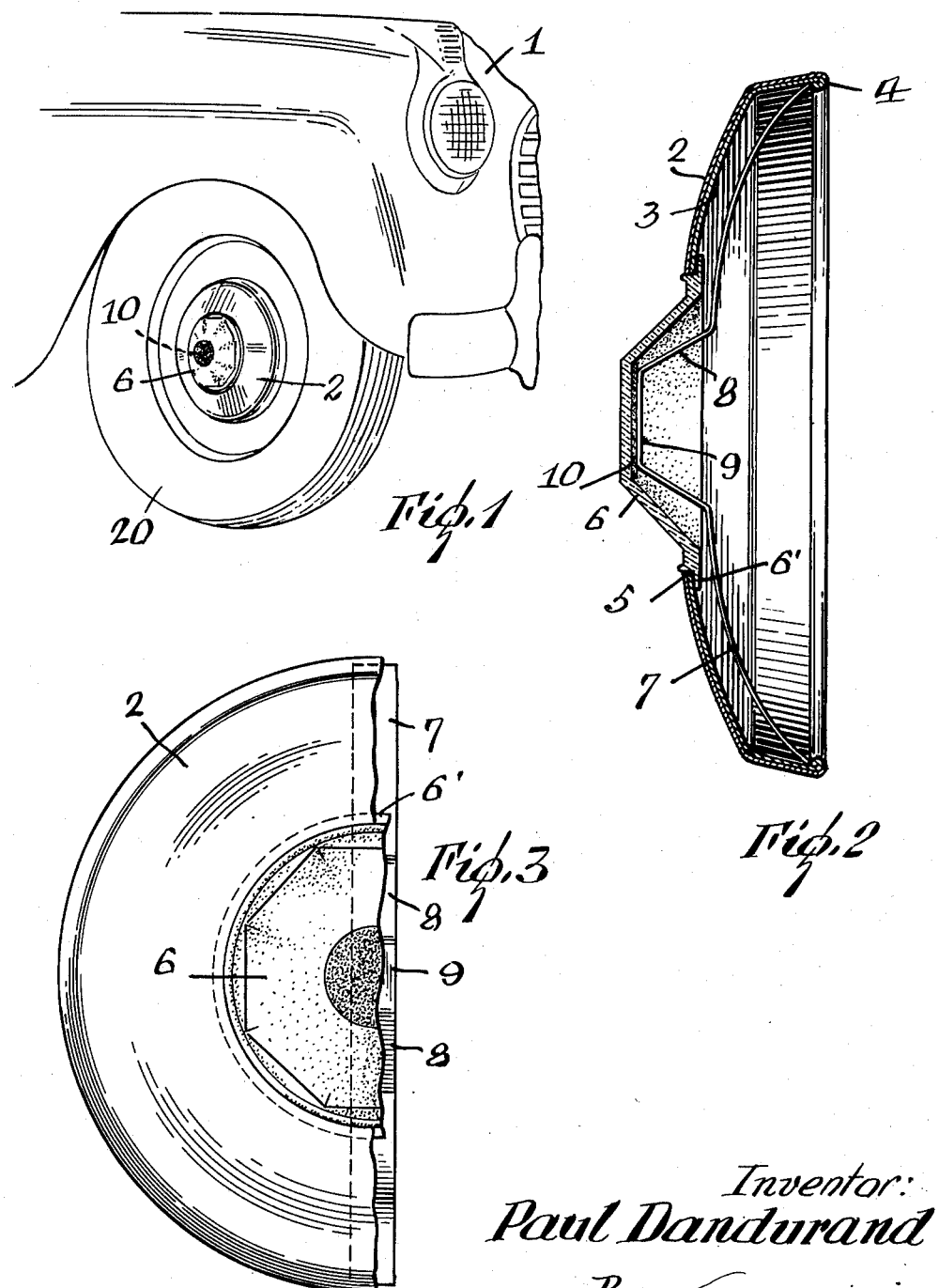
Inventor:
Paul Dandurand
By
Attorney Patented Apr. 15, 1952

2,593,274

UNITED STATES PATENT OFFICE 2,593,274

HUBCAP

Paul Dandurand, Montreal, Quebec, Canada

Application March 20, 1948, Serial No. 16,100

7 Claims. (Cl. 301—108)

The present invention pertains to a novel hub cap for automobile wheels of the disk type.

The present hub caps are dished outward and are subject to being bent by impact with other objects. The principal object of this invention is to reduce such distortion and damage without sacrificing the disked or convex design of the hub cap.

Another object of the invention is to provide a luminous or decorative device in the hub cap, the luminous device serving as a signal at night.

In the accomplishment of the objects, the novel hub cap includes a dished plate or pair of plates, as usual, but these are formed with a central opening. In the opening is fitted a transparent insert which consists preferably of a plastic and somewhat resilient material. A strip metal spring is seated in the plate or plates and bears outwardly against the insert. Thus, the insert yields on impact, and a distortion thereof may be eventually corrected by the continuous pressure of the spring. The aforementioned luminous or decorative member may be held between the spring and the transparent insert.

The invention is fully disclosed by way of example in the following description and in the accompanying drawings in which:

Figure 1 is a perspective view of the front end of an automobile body, equipped according to the invention;

Figure 2 is a transverse section of a wheel equipped according to the invention; and Figure 3 is a detail and partial elevation of the wheel.

References to these views will now be made by use of like characters which are employed to designate corresponding parts throughout.

In Figure 1 is shown a portion of an automobile body 1 and one of the wheels 20 thereof. The wheel is of the conventional disk type having a hub cap for concealing the bolts and nuts that secure the hub of the wheel to the axle in the usual manner.

In the invention, the hub cap includes a pair of plates 2 and 3 circular in contour and dished outwardly, as shown in Figure 2. The disks or plates are beaded together at 4 at their edges where they snap into the assembly. This expedient is well known in the art and therefore not illustrated.

The plates 2, 3 are apertured centrally and coincidently at 5 to receive an ornamental and practical insert 6. This member is also dished outwardly, in a somewhat pyramidal form, and is made of a transparent plastic material which is preferably non-shatterable and somewhat resilient. The edge of the member 6 is flanged at 6' to bear against the inner surface to the plate 3.

A strip metal spring 7 has its ends seated in the bead 4 and is suitably bent at 8 to bear against the center of the member 6. Thus, if the member 6 should be bent inward by impact with another object, the impact is first resisted and the distortion is eventually eliminated by the steady pressure of the spring.

The center of the spring is preferably made flat at 9 and another purpose is served thereby. A sheet member 10 may be held between the center of the spring and the center of the insert 6. The member 10 may be painted with phosphorescent material and will thus serve as a luminous signal at night. A coat of luminous paint may replace member 10. Otherwise the member 10 may be colored or decorated with an emblem if desired.

Although a specific embodiment of the invention has been illustrated and described, it will be understood that various alterations in the details of construction may be made without departing from the scope of the invention as indicated by the appended claims.

What I claim as my invention is:

1. A hub cap comprising a circular and dished member having a central opening, a transparent non-shatterable insert slidably fitted in and protruding outwardly from the plane of said opening and having a flange engaging the inner surface of said member, and a spring mounted in said member and bearing outwardly against said insert.

2. A hub cap comprising a circular and dished member having a central opening, a transparent non-shatterable insert slidably fitted in and protruding outwardly from the plane of said opening and having a flange engaging the inner surface of said member, and a spring mounted in said member and bearing outwardly against said insert, mutually adjacent parts of said insert and spring being flat.

3. A hub cap comprising a circular and dished member having a central opening, a transparent non-shatterable insert slidably fitted in and protruding outwardly from the plane of said opening and having a flange engaging the inner surface of said member, and a spring mounted in said member and bearing outwardly against said insert, mutually adjacent parts of said insert and spring being flat, and an ornamental member inserted between said parts.

4. A hub cap comprising a circular and dished member having a central opening, a transparent non-shatterable insert slidably fitted in and protruding outwardly from the plane of said opening and having a flange engaging the inner surface of said member, and a spring mounted in said member and bearing outwardly against said insert, mutually adjacent parts of said insert and spring being flat, and a luminous disk inserted between said parts.

5. A hub cap comprising a circular and dished member having a central opening, a transparent non-shatterable insert slidably fitted in and protruding outwardly from the plane of said opening and having a flange engaging the inner surface of said member, and a strip metal spring having its ends seated at the edge of said member and its central portion bearing against said insert.

6. A hub cap comprising a circular and dished member having a central opening, a transparent non-shatterable insert slidably fitted in and protruding outwardly from the plane of said opening and having a flange engaging the inner surface of said member, and a strip metal spring having its ends seated at the edge of said member and its central portion bearing against said insert, mutually adjacent parts of said insert and spring being flat.

7. A hub cap comprising a circular and dished member having a central opening, a transparent non-shatterable insert slidably fitted in and protruding outwardly from the plane of said opening and having a flange engaging the inner surface of said member, and a strip metal spring having its ends seated at the edge of said member and its central portion bearing against said insert, mutually adjacent parts of said insert and spring being flat, and an ornamental member inserted between said parts.

PAUL DANDURAND.

REFERENCES CITED

The following references are of record in the file of this patent:

UNITED STATES PATENTS

| Number | Name | Date |
| --- | --- | --- |
| 1,814,054 | Munson | July 14, 1931 |
| 1,857,659 | Reid | May 10, 1932 |
| 2,030,255 | Howard | Feb. 11, 1936 |
| 2,044,654 | Whited | June 16, 1936 |
| 2,151,485 | Pawsat | Mar. 21, 1939 |

FOREIGN PATENTS

| Number | Country | Date |
| --- | --- | --- |
| 22,744 | Great Britain | 1910 |